Patented Nov. 5, 1929

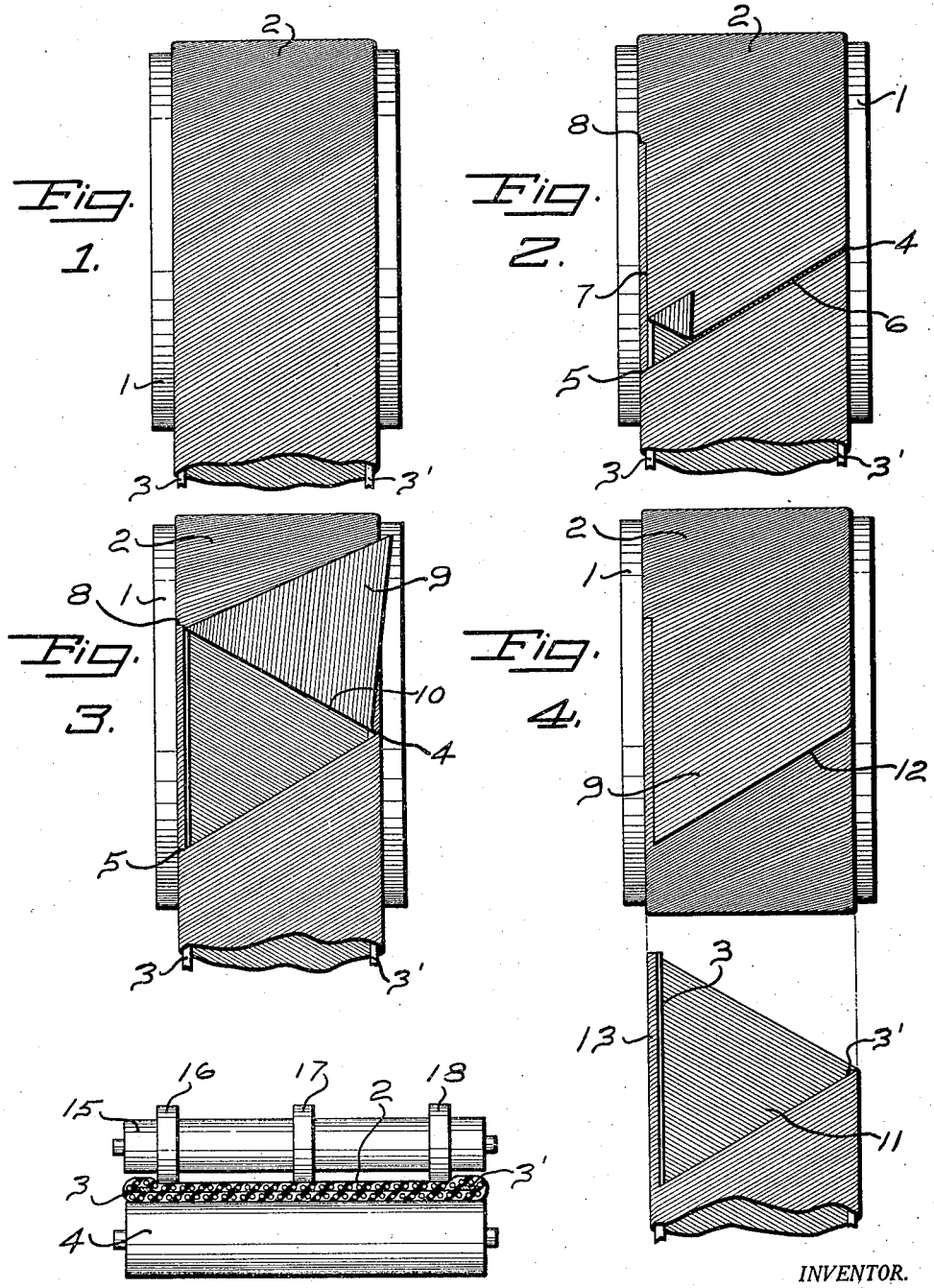

1,734,241

UNITED STATES PATENT OFFICE

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

PNEUMATIC TIRE CASING

Application filed March 22, 1926. Serial No. 96,569.

My invention relates to that method of manufacturing pneumatic tire casings in which a plurality of convolutions of a web of carcass material, formed by winding rubberized cords helically about spaced bead elements, are wound upon a core or former to form the body or carcass of the casing, as disclosed for instance in the patent to Henry J. Doughty No. 1,446,165. When the web is cut, the end of the portion of the carcass material on the core or former is secured or "spliced" to the underlying convolution to complete the body or carcass of the casing while the free end of the web, becomes the starting end of the next carcass to be built. Included in my invention is a method of severing the web of carcass material at the end of the winding operation in such manner that the splice formed at the beginning and end of the convolutions of the tire carcass, shall possess special advantages as later pointed out. It is an object of my invention to so cut the web of carcass material that the ends of the severed cords, both at the beginning and the end of the convolutions of the carcass, will be so positioned with relation to the body of the casing and the adjacent cord elements thereof that any tendency of the cord ends to become displaced under working strains will be reduced to a minimum and the carcass structure rendered as uniform as possible, with all the cords both on the interior and exterior surfaces substantially parallel to each other. Other and further objects will be apparent from the following specifications and claims.

In the accompanying drawings which illustrate one embodiment of my invention:

Figure 1 shows a core with a plurality of convolutions of the two-ply carcass material wound thereon, ready for severing of the web.

Figure 2 is a similar view showing the initial steps of my method,

Figure 3 is a similar view showing the top ply of the carcass material laid back, Figure 4 shows the completion of the severing operation, and Figure 5 is a diagrammatic view of a preferred manner of pressing the plies together to permit easy manipulation of the fabric during the severing operation.

Referring to the drawings 1 designates the core upon which the two-ply carcass material 2, having enclosed bead elements 3 and 3' is wound. While I have shown a core of the drum type, it will be understood that my method may be equally well employed with any other type of core. We will assume that the desired number of convolutions of carcass material have been wound on the core. In starting the severing operation it is preferable to first sever the upper ply of the web and this is conveniently done by cutting a single cord adjacent one bead, as at 4, which point directly overlies the corresponding starting end of the convolutions of carcass material on the former, pulling the so-cut cord across to the other bead and cutting it off at 5. This removal of a single cord of the upper ply is indicated at 6 in Figure 2. The upper ply is then cut centrally of the bead core 3 as indicated at 7, the cut being started substantially at the point 5 and extending to 8. The latter point as will be evident from an inspection of the drawings is substantially the point where the lower run of the cord removed at 6 turns about the bead 3. In practice this point is easily determined since it directly overlies the starting end of the convolutions on the former. The upper ply is now stripped back as shown in Figures 2 and 3, forming a free triangular single ply "splicing" end 9 which may be turned back in the direction of the core, that is, away from the source of fabric supply, along a line parallel to the cords of the lower ply. If desired the step of removing the cord 6 may be omitted, the cut 7 then being the initial step, the upper ply being ruptured by the act of stripping back the portion 9. The removal of the cord 6 however facilitates the stripping operation and gives a positive indication of the point 5 at which cut 7 is started. The beads 3 and 3' are now cut at 8 and 4 respectively (see Figure 3) and the under ply of the carcass material torn across on the line 10 of the lower ply cords which is easily accomplished as it is only necessary to rupture the rubber coating and the light weft threads, if the latter are present in the fabric. The separated end of the web is shown at 11 in Figure 4. The "splicing" is done by laying the end 9 down on the carcass as indicated at 12 in Figure 4. From the latter figure it will be evident that the cords on the outer surface of the completed carcass are all parallel and that the cut ends of the cords are all located along the bead. The end 11 becomes the starting end of the next carcass to be formed and as will be obvious, the cut ends 13 of the cords, as well as the exposed portion of the beads 3, 3′ will be buried by the succeeding convolutions of material and that the cords on the inner surface of the carcass will all be parallel.

A desirable step in carrying out my method is shown in Figure 5. In forming the carcass material, the plies are pressed into adhering contact. In order that the portion 9 may be easily stripped back it is desirable that the pressure applied to the plies in forming the carcass material should not be excessive. This may be accomplished by applying the pressure by means of rolls 14 and 15 the latter having raised portions 16, 17 and 18 so positioned as to apply the pressure adjacent the bead portions and to the central portion of the plies. The raised portions 17 produce an adhesion between the plies sufficient to prevent wrinkling or displacement without offering undue resistance when the plies are to be stripped apart in the severing operation.

I claim:

1. In that method of forming the carcass of a pneumatic tire casing wherein a plurality of convolutions of a web of two ply cord carcass material, provided with enclosed bead elements, have been wound upon a core, the steps of cutting the upper ply longitudinally along the center of one of the bead elements, and separating the plies so as to permit turning the upper ply back in the direction of the core along a line parallel to the cords of the lower ply, severing the bead elements at the juncture of the free portion of the upper ply with the body of the carcass, severing the lower ply, at said juncture, along the line of its cords to complete the severance of the web and finally laying the turned back portion of the upper ply upon the underlying convolution of carcass material.

2. In that method of forming the carcass of a pneumatic tire casing wherein a plurality of convolutions of a two ply web of cord carcass material, having enclosed bead elements, have been wound upon a core, the steps of severing the upper ply along the line of its cords, cutting the upper ply longitudinally along the center of one of the bead elements, so as to permit the upper ply to be turned back, in the direction of the core, along a line parallel to the cords of the lower ply, severing the bead elements at the juncture of the free portion of the upper ply with the body of the carcass, severing the lower ply, at said juncture, along the line of its cords to complete the severance of the web and finally laying the turned back portion of the upper ply upon the underlying convolution of carcass material.

3. In that method of forming the carcass of a pneumatic tire casing in which a plurality of convolutions of a two ply web of cord carcass material, provided with enclosed bead elements, have been wound upon a core, the steps of removing a cord of the upper ply from bead to bead, cutting the upper ply longitudinally along the center of one of the bead elements so as to permit the upper ply to be turned back in the direction of the core along a line parallel to the cords of the lower ply, severing the bead elements at the juncture of the free portion of the upper ply with the body of the carcass, separating the lower ply, at said juncture, along the line of its cords to complete the severance of the web and finally laying the free portion of the upper ply upon the underlying convolution of carcass material with the severed ends of the cords positioned substantially over the underlying bead element, whereby all of the cords on the surface of the so completed carcass are substantially parallel.

4. The method of severing a two ply web of tire carcass material, having enclosed bead elements, to form splicing ends which comprises cutting the upper ply longitudinally along one of the bead elements, and separating the plies so as to permit turning the upper ply back along a line parallel to the cords of the lower ply, severing the bead elements at the juncture of the free portion of the upper ply with the body of the carcass and severing the lower ply, at said juncture, along the line of its cords to complete the severance of the web.

5. The method of severing a two ply web of tire carcass material, having enclosed bead elements which comprises separating the upper ply along the line of its cords, severing said ply longitudinally along one of the bead elements to permit the upper ply to be turned back on itself along a line parallel to the cords of the lower ply, severing the bead elements at the juncture of the free portion of the upper ply with the body of the carcass and severing the lower ply at said juncture along the line of its cords to complete the severance of the web.

In testimony whereof I have signed my name to the above specification.

GEORGE F. WIKLE.